United States Patent Office 2,947,554
Patented Aug. 2, 1960

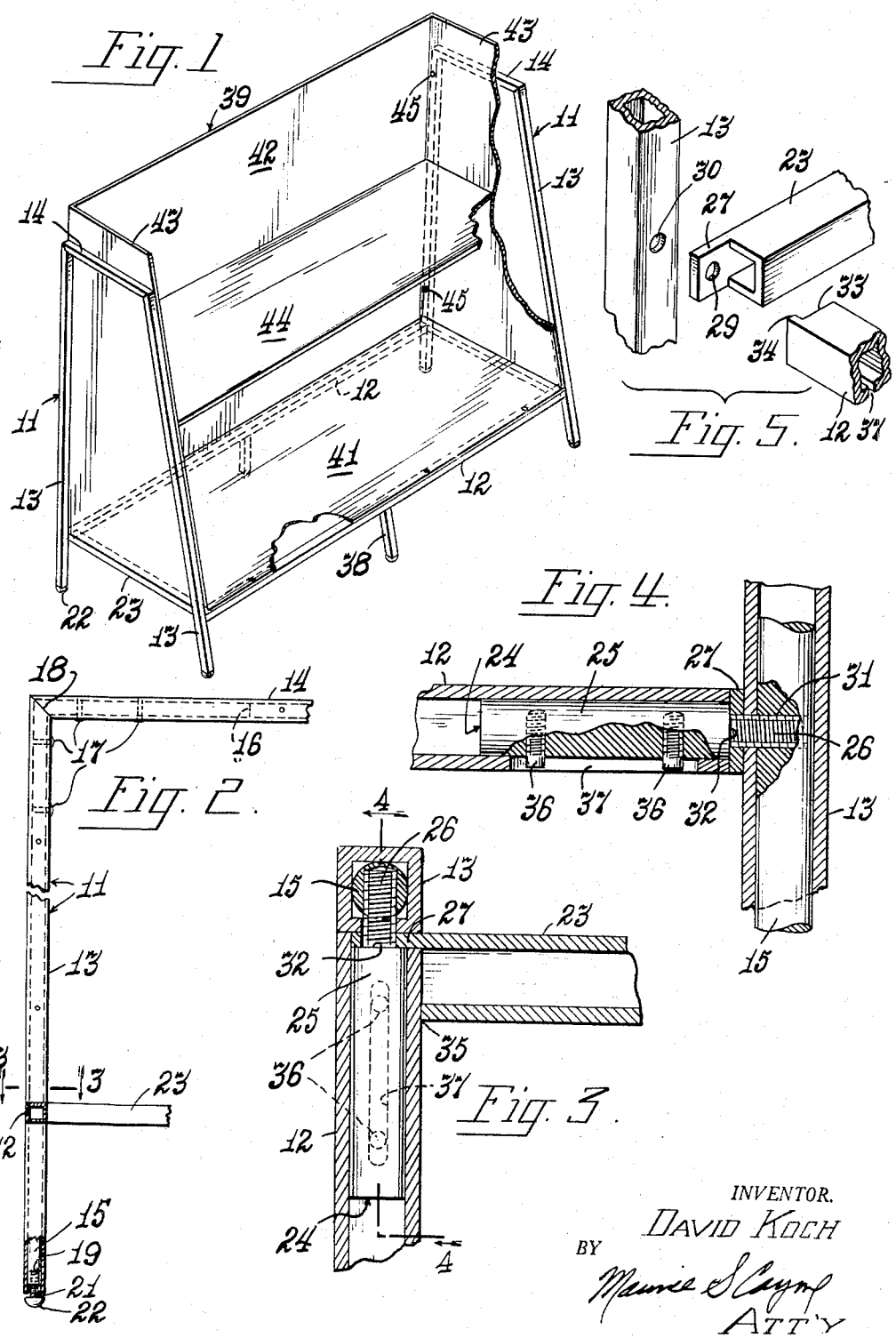
Aug. 2, 1960 — D. KOCH — 2,947,554
RACK CONSTRUCTION
Filed Feb. 21, 1957
INVENTOR.
DAVID KOCH

2,947,554

RACK CONSTRUCTION

David Koch, Chicago, Ill., assignor to Morris Kurtzon, Incorporated, Chicago, Ill., a corporation of Illinois Filed Feb. 21, 1957, Ser. No. 641,511

10 Claims. (Cl. 287—54)

The invention relates to improvements in display units and is particularly concerned with the novel construction and assembly of a rack or frame structure fabricated principally from aluminum tubing.

The frame structure embodying the present invention is designed primarily for supporting a display unit which may comprise a showcase or shelving, either of which is fabricated entirely or in a substantial part from wood or from wood and glass. The frame structure comprises a tubing assembly wherein normally thin walled tubing, preferably square in section, is reinforced in part with solid rod stock and wherein a firm connection is obtained between joined portions of the tubing without welding. The conventional practice of welding the joints between various related portions of the structure is objectionable, particularly when color-anodized tubing is used. The structure also includes novel means to permit expansion and contraction of selected portions of the structure at predetermined connections so as to allow the structure to be assembled as an integral part of a display unit fabricated in whole or in part from wood. It has been found that wooden display units expand and contract sufficiently under normal conditions of use so as to make it impractical to mount them in a rigid integrated metal assembly. As will become apparent as the description proceeds, the structural details herein disclosed may be incorporated in structures fabricated for uses other than the use selected herein for purposes of disclosure.

It is therefore an object of the invention to provide a novel frame structure fabricated principally from tube stock.

Another object is to provide novel means for reinforcing a structure fabricated from thin-walled tube stock.

Another object of the invention is to provide novel means for connecting thin-walled tube stock in a reinforced joint without welding.

Another object is to provide a novel reinforced expansion joint at the connection between complemental pieces of tubing.

Another object is to provide a frame structure of the character described with novel leveling means.

Another object is to provide a novel assembly of tubular elements which is extremely simple in its construction, inexpensive to construct and easy to assemble, and very practical.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a perspective view illustrating the novel frame structure having a display unit mounted therein.

Fig. 2 is a fragmentary inside elevational view of one of the end frames showing an attached stretcher and a part of the end frame in section.

Fig. 3 is an enlarged horizontal detail sectional view taken substantially on line 3—3 of Fig. 2.

Fig. 4 is a detail vertical sectional view taken substantially on line 4—4 of Fig. 3.

Fig. 5 is an exploded view of the tubing elements comprising the structure illustrated in detail in Figures 3 and 4.

Referring particularly to Fig. 1 of the accompanying drawing the frame structure illustrated comprises a pair of end frames 11 which are suitably connected together adjacent to their lower ends by stretchers 12. Each end frame preferably is fabricated from aluminum, thin-walled square tubing and it comprises a substantially inverted U-shaped configuration including legs 13 and a connecting bight portion 14. Each of the legs 13 is suitably reinforced (Fig. 2) by having telescoped therein throughout its entire length a reinforcing rod 15, the lower end of which terminates at or short of the bottom end of the leg and the upper end of which is bent substantially at right angles to the leg 13, as at 16, so as to be telescoped into the bight portion 14. Suitable screws, such as those indicated at 17, are extended through one wall of the leg 13 and bight portion 14 for threading engagement in tapped openings provided in the reinforcing rod 15—16 so as to secure the rod 15—16 firmly within the tubing and to prevent telescoping movement of the tubing portions 13 or 14 relative to the rod 15—16. In the present disclosure, the legs 13 and the bight portion 14 of the end frame 11 constitute separate pieces of tubing which are mitered at their abutting ends, as at 18, to provide a smooth unobtrusive joining between the separate tube portions.

The lower end of each reinforcing rod 15 preferably is provided with a tapped axial opening 19 to receive the threaded shank 21 of a foot or leveling device 22 provided on each leg so as to facilitate leveling of the frame structure to compensate for any unevenness in the surface upon which it is placed.

Each end frame 11 includes a brace 23 which also is fabricated from square tubular metal stock which brace is located adjacent to the bottom ends of the legs 13 of said frame, in the same horizontal plane as the stretchers 12, and which bridges the space between said legs so as to provide rigid lateral reinforcement of the legs 13. In order to mount the brace 23 on the legs 13, without welding, the ends of the brace 23 are firmly secured to the related leg 13 by means of a novel connector plug 24 best illustrated in Figures 3 and 4. The connector plug 24 includes a body portion or stud 25 having outside dimensions corresponding to the inside dimensions of the tube stock used in fabricating the frame structure. The body portion 25 is formed at one end with an integral externally threaded portion 26 of reduced diameter.

The mounted end of the brace preferably is cut away, as best illustrated in Figure 5, to provide a tongue 27 projecting beyond the end of the brace, which tongue is of a length slightly less than the width of the leg 13. Both the tongue 27 and the underlying portion of the wall of the leg 13 against which it is placed in face to face engagement are provided with aligned openings 29 and 30, respectively, through which the threaded portion 26 of the connector plug is freely projected. The rod 15 within the leg 13 is formed with a tapped hole 31 in registering alignment with the holes 29 and 30 to receive the threaded portion 26 of the connector plug 24 threaded therein tightly so as to bring a shoulder 32 formed at the juncture of the threaded portion 26 and body portion 25 of said connector plug in tight abutment with the related face of the tongue 27. The connector plug thereby firmly mounts the brace 23 on the legs 13, thus reinforcing the end frame 11.

The stretchers 12, which also are fabricated from square tube stock, are mounted at their ends on the end frames 11 by means of the connector plugs 24. Each end of the stretcher 12 is telescoped over the body portion 25 of a related connector plug 24. Referring now particularly to Figure 5, it will be observed that the end of the stretcher is offset, as at 33, to provide a short tongue or flange 34 on the end of one wall thereof which flange is adapted to have end abutment with the related leg 13 and surface abutment with the end of the tongue 27 on the related brace 23. The wall of the stretcher opposed to the wall having the flange 34 thereon is in surface abutment with the offset end of the related brace 23, as indicated at 35 in Fig. 3.

The telescope mounting of the ends of the stretchers 12 on the connector plug 24 affords a means whereby the spacing between the end frames 11 may adjust itself to compensate for any longitudinal expansion which might occur in the wood forming the rack unit mounted therein. Complete separation of the ends of the stretchers from the connector plugs is prevented by providing the body portion 25 of said plug with a pair of radial projections 36 which may consist of studs screw-threaded into the body 25. These projections lie within a longitudinal slot 37 formed in the bottom wall of the stretcher 12 and, as is best illustrated in Fig. 4, said slot 37 is of a length greater than the spacing between the outermost faces of the projection 36 thereby permitting sliding movement of the stretcher relative to the connector plug 24. If desired, legs 38 may be secured to the stretchers intermediate their ends.

Although any form of rack unit may be mounted within the frame structure, one embodiment thereof may consist of an open shelf-like structure of the type illustrated at 39. This srtucture may include a floor 41, that is seated upon and may be secured to the braces 23 and stretchers 12, a back wall 42 and end walls 43, with one or more shelves 44 bridging the space between the end walls 43. The end walls 43 may be secured to the end frames as by means of screws 45. It should be apparent that when a metal frame structure of the kind illustrated is associated with and attached to a display unit fabricated wholly or in part of wood, such frame structure must expand and contract a limited amount to compensate for normal expansion and contraction of the wood constituting the display unit. This expansion and contraction longitudinally is adequately compensated for or by the connections afforded by the stretchers 12 connecting the end frames 11.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A frame structure comprising a square tubular leg member, a square tubular brace, said brace having a tongue on one end of one of its walls lying in fact to face abutment with one wall of the leg member, aligned holes in said tongue and said leg wall, a rod within the leg having a tapped opening in register with said holes, a connector plug having an axial externally threaded end of reduced diameter providing a shoulder thereon, said end extending through the holes and being threaded into the tapped opening so as to carry the shoulder into tight abutment with the tongue to secure the brace to the leg member, a square tubular stretcher telescoped over the connector plug in end abutment with the tongue, one wall of said stretcher abutting the end of the brace, a tongue on the end of the opposite stretcher wall overlying the end of the tongue and having end abutment with the leg member, a slot in the stretcher end substantially co-extensive with the length of the connector, and radial projections on the connector extending through said slot.

2. A frame structure comprising a square tubular leg member, a square tubular brace, said brace having a tongue on one end of one of its walls lying in face to face abutment with one wall of the leg member, aligned holes in said tongue and said leg wall, a rod within the leg having a tapped opening in register with said holes, a connector plug having an axial externally threaded end of reduced diameter providing a shoulder thereon, said end extending through the holes and being threaded into the tapped opening so as to carry the shoulder into tight abutment with the tongue to secure the brace to the leg member, a square tubular stretcher telescoped over the connector plug in end abutment with the tongue, one wall of said stretcher abutting the end of the brace, a tongue on the end of the opposite stretcher wall overlying the end of the tongue and having end abutment with the leg member, and means securing the stretcher to the connector.

3. A tubular frame structure comprising a tubular leg member, a brace, said brace having a tongue on one end lying in face to face abutment with one wall of the leg member, aligned holes in said tongue and said leg wall, a rod within the leg having an opening in register with said holes, a connector plug having an axial end portion of reduced diameter providing a shoulder thereon, said end portion extending through the holes and being secured in said opening so as to hold the shoulder in tight abutment with the tongue to secure the brace to the leg member, a tubular stretcher telescoped over the connector plug, one wall of said stretcher abutting the end of the brace, a longitudinal slot in the stretcher substantially coextensive with the length of the connector, and at least one radial projection on the connector extending through said slot to limit sliding of the stretcher on the connector.

4. A frame structure comprising a square tubular leg member, a brace arranged with an end portion in face to face abutment with one wall of the leg member, aligned holes in said end portion and said leg wall, an insert within the leg having an opening in register with said holes, a connector having an axial end portion of rdeuced diameter providing a shoulder thereon, said end portion extending through the holes and being secured in the opening so as to retain the shoulder in tight abutment with the end portion to secure the brace to the leg member, a tubular stretcher having an end telscoped over the connector, a longitudinal slot in said stretcher end substantially coextensive with but terminating short of the length of the connector, and means on the connector extending through said slot for limiting sliding movement of said stretcher on said connector.

5. In a frame structure, a first part, a second part, means securing said second part to the first part, a stud on said means, a third part telescoped over said stud, and means to slidably secure said third part to said stud and to prevent their separation.

6. In a frame structure, a first longitudinal part, a second longitudinal part disposed angularly to said first part, a tubular third longitudinal part disposed angularly to each of said first and second parts, and a connecting element extending axially within said tubular third part and transversely through said first and second parts, said element including means for securing said first and second parts together and means for adjustably mounting said third part for back and forth sliding movement along its axis.

7. In a frame structure as recited in claim 6, means for limiting said movement.

8. In a frame structure as recited in claim 6 wherein said last recited means comprises a connector having a threaded portion extending therefrom through said second part and securing said second part to said first part, said connector being telescoped within said third part so as to adjustably mount said third part for said movement.

9. In a frame structure, a shaft, a tubular member disposed angularly to said shaft, a connecting element extending axially through said tubular member and transversely through said shaft, means for engaging said connecting element to said shaft, and means on said connecting element mounting said tubular member for sliding movement along an axis disposed angularly to said shaft.

10. In a frame structure, a longitudinal member, a tubular member disposed angularly to said longitudinal member, a connecting element extending axially through said tubular member and transversely through said longitudinal member, means for engaging said longitudinal member to said connecting element, and means on said connecting element mounting said tubular member for sliding movement along an axis disposed angularly to said longitudinal member.

References Cited in the file of this patent

UNITED STATES PATENTS

| | | |
|---|---|---|
| 1,059,844 | Dean | Apr. 22, 1913 |
| 1,898,343 | Davidson | Feb. 21, 1933 |
| 2,037,980 | Heartz | Apr. 21, 1936 |
| 2,110,158 | Keeler | Mar. 8, 1938 |
| 2,238,561 | Goodyear | Apr. 15, 1941 |
| 2,239,360 | Bersin | Apr. 22, 1941 |
| 2,308,831 | Roney et al. | Jan. 19, 1943 |
| 2,474,727 | Denier | June 28, 1949 |
| 2,795,337 | Hagar | June 11, 1957 |
| 2,815,972 | Lagervall | Dec. 10, 1957 |